United States Patent [19]

Voecks et al.

[11] Patent Number: 5,057,473

[45] Date of Patent: Oct. 15, 1991

[54] REGENERATIVE CU LA ZEOLITE SUPPORTED DESULFURIZING SORBENTS

[75] Inventors: Gerald E. Voecks, La Crescenta; Pramod K. Sharma, La Canada, both of Calif.

[73] Assignee: The United States of America as represented by the Administrator of the National Aeronautics and Space Administration, Washington, D.C.

[21] Appl. No.: 508,386

[22] Filed: Apr. 12, 1990

[51] Int. Cl.$^5$ ............................................... B01J 29/10
[52] U.S. Cl. ..................................................... 502/73
[58] Field of Search ............................. 502/73, 65, 67; 208/246

[56] References Cited

U.S. PATENT DOCUMENTS

| 3,679,604 | 7/1972 | Lee et al. | 502/73 |
|---|---|---|---|
| 3,835,032 | 9/1974 | Dolbear et al. | 502/65 |
| 3,867,307 | 2/1975 | Scherzer et al. | 502/73 |
| 4,153,535 | 5/1979 | Vasalos et al. | 208/120 |
| 4,188,285 | 2/1980 | Michlmayr | 208/246 |
| 4,358,297 | 11/1982 | Eberly, Jr. | 55/62 |
| 4,442,221 | 4/1984 | Bishop, III et al. | 208/246 |
| 4,478,800 | 10/1984 | van der Wal et al. | 423/230 |
| 4,542,116 | 9/1985 | Bertolacini et al. | 502/65 |
| 4,613,724 | 9/1986 | DeBras et al. | 585/824 |
| 4,642,177 | 2/1987 | Mester et al. | 208/113 |
| 4,673,557 | 6/1987 | Nieskens et al. | 423/230 |
| 4,729,889 | 3/1988 | Flytani-Stephanepoulos et al. | 423/593 |
| 4,790,982 | 12/1988 | Yoo et al. | 423/239 |

OTHER PUBLICATIONS

Sub et al, "Oxidative Sorption of Sulfur Dioxide by Copper/Zeolite", Sekiyu Gakkaishi, vol. 31, No. 2, pp. 147-153 (1988).
Bal et al, "Removal of Sulfur Impurities from Ethylbenzen", Koks, Smola, Gaz., vol. 32, No. 4, pp. 93-97.

*Primary Examiner*—Carl F. Dees
*Attorney, Agent, or Firm*—Thomas H. Jones; Harold W. Adams; John R. Manning

[57] ABSTRACT

Efficient, regenerable sorbents for removal of $H_2S$ from fluid hydrocarbons such as diesel fuel at moderate condition comprise a porous, high surface area aluminosilicate support, suitably a synthetic zeolite, and most preferably a zeolite having a free lattice opening of at least 6 Angstroms containing from 0.1 to 0.5 moles of copper ions, lanthanum ions or their mixtures. The sorbent removes sulfur from the hydrocarbon fuel in high efficiency and can be repetitively regenerated without loss of activity.

3 Claims, 1 Drawing Sheet

REGENERATIVE CU LA ZEOLITE SUPPORTED DESULFURIZING SORBENTS

ORIGIN OF THE INVENTION

The invention described herein was made in the performance of work under a NASA contract, and is subject to the provisions of Public Law 96-517 (35 USC 202) in which the Contractor has elected to not retain title.

BACKGROUND OF THE INVENTION

The present invention relates to novel regenerative sorbents for removal of sulfur containing hydrocarbons (organic sulfur compounds) from hydrocarbon liquid streams and, more particularly, a Cu/La zeolite sorbent for removing organosulfur compounds from diesel fuel.

Many approaches have been applied to the control of sulfur in fuel feedstreams. These approaches vary with the fuel and the type of sulfur compounds involved. In the case of coal, there are three options where sulfur removal may be applied. When coal is burned directly for power, for example, sulfur exists as oxides and is removed from the gas effluent from the combustor. When coal is gasified, sulfur exists as hydrogen sulfide and may be removed by conventional methods from the gaseous effluent. A third option being explored is to remove the sulfur during gasification of the coal, a process which requires coal pretreatment. The latter process offers the advantage of treating the sulfur problem in a less hostile environment and where the sulfur compounds are more concentrated, reducing the complexity of the removal process.

In the case of liquid fuels, the first two cleanup process options described above are commonly applied. In the area of the third option, hydrodesulfurization of the fuel, for example, is a commercial process where the fuel is treated at high temperatures with high pressures of hydrogen to produce hydrogen sulfide. The hydrogen sulfide is subsequently removed in a relatively low temperature process with either a solid material like zinc oxide, or a liquid. Regeneration is a highly desirable, if not required, property of the hydrogen sulfide sorbent. When the sulfur compounds are removed prior to the gasification or combustion process, the task is more economically viable and technically simpler. Although hydrodesulfurization is commonly used commercially, it is not a simple process due to the incorporation of a catalyst bed, a sorbent bed, and a recycle of pressurized hydrogen feed. At the present time there is no commercially available material which would remove the sulfur compounds directly from the common liquid fuels and be capable of regeneration. Such a process would eliminate the need for pressurizing and recycling hydrogen as well as eliminating the catalyst bed.

One option to removing $H_2S$ from the gasifier gas streams is to remove the sulfur from the liquid feedstock prior to the gasification process. In the case of liquid hydrocarbon feedstocks, such as Diesel fuel or fuel oil, this requires the selective removal of the sulfur-containing hydrocarbons (organosulfur compounds) from the feedstock. This can be accomplished, conceivably, when the feedstock is in either the liquid or gaseous state. The desired goal would be to remove all organosulfur compounds, eliminating the need for any down stream scrubbing devices. However, the removal of one-half or more of the organosulfur compounds would greatly reduce the duty requirements and/or size of the downstream scrubber. This would greatly enhance possibility for providing clean output gas streams of a quality suitable for feeding to fuel cells or gas turbine power plants.

Efforts addressing the problem of sulfur removal from liquid, hydrocarbon, feedstock have been suggested but no solutions have been found. The problem has been one of capturing the sulfur compounds to a high degree under such partitioning effects that occur in a dynamic situation, and of understanding how to selectively remove them from a liquid on a continuous basis, as compared to a batch process.

LIST OF PRIOR REFERENCES

1. U.S. Pat. No. 4,153,535, Vasalos et al.
2. U.S. Pat. No. 4,358,297, Eberly, Jr.
3. U.S. Pat. No. 4,542,116, Bertolacini et al.
4. U.S. Pat. No. 4,613,724, DeBras et al.
5. U.S. Pat. No. 4,642,177, Mester et al.
6. U.S. Pat. No. 4,673,557, Nieskens et al.
7. U.S. Pat. No. 4,790,982, Yoo et al.
8. U.S. Pat. No. 4,478,800, van der Wal et al.
9. U.S. Pat. No. 4,729,889, Flytani-Stephanopoulos et al.

LITERATURE REFERENCES

10. Sub et al. "Oxidative Sorption of Sulfur Dioxide By Copper/Zeolite." Sekiyu Gakkaisnr, Vol. 31, No. 2, Pages 147-153.
11. Bal et al. "Removal of Sulfur Impurities from Ethylbenzene," Koks, Smola, Gaz., Vol. 32, No. 4, Pages 93-97.

DISCUSSION OF PRIOR ART

The existing industrial method for removing sulfur from petroleum fractions employs hydrodesulfurization followed by amine scrubbers or zinc oxide to remove residual $H_2S$. Hydrodesulfurization is operated at high temperature and pressure and requires a substantial amount of hydrogen to convert the sulfur as organosulfur compounds to $H_2S$ for subsequent removal from the fuel. The amine scrubbers must be regenerated and again requires use of an expensive reagent.

Liquid amines such as methyldiethanolamine are effectively used in gas scrubbing units to selectively absorb $H_2S$ from gas streams such as natural gas and ammonia synthesis or reformer gas streams. However, amine scrubbing units operate at low temperature and low circulation rate. This is thermally inefficient since the hot gas stream must be cooled before scrubbing and reheated after scrubbing. Low flow rates and low temperatures are necessary to reduce boiling and formation of aerosols which will carry over into the next unit.

Recently there have been several studies of the use of mixed oxide sorbents alone or supported on refractory supports such as alumina or silica or crystalline aluminosilicates such as zeolites to remove $H_2S$ from a hot gas stream. For example, various mixed metal oxide combinations disclosed in U.S. Pat. No. 4,729,889 (9) the disclosure of which is expressly incorporated herein by reference, have been demonstrated to serve as excellent regenerative sorbents for removing hydrogen sulfide from hot reducing gas mixtures typical of coal gasifiers, autothermal reformers, etc. These materials have been demonstrated to be maintained in their active state while in the temperature range of 550-700° C. but mainly in an unsupported state, i.e., not on conventional supports used for heterogeneous catalysts such as pellets, particles, monolithic columns, etc.

In Ser. No. 123,036 filed Nov. 19, 1987 and now abandoned, the disclosure of which is expressly incorporated herein by reference, it was discovered that a mixed oxide sorbent supported on a porous aluminosilicate material efficiently removes hydrogen sulfide from a hydrogen rich gas mixture at temperatures from 200° C. to 550° C. The supported sorbent is conveniently regenerated to full capacity in acceptable time periods by treatment with oxygen containing gas at temperatures from 550° C. to 700° C., preferably from 600-650° C. The sorbent material can function in the presence of CO and $CO_2$ and retains high capacity for hydrogen sulfide removal for over 10 cycles in stoichiometric proportion relative to the active metal oxide contained in the sorbent.

The porosity of the alumino-silicate support is sufficient to provide adequate gas throughput in practical, industrial time periods and to provide plug-like absorption performance. The surface area of the fresh support is from 10 to 500 $m^2/g$. The surface area of the support after loading with mixed metal oxides is at least 0.1 $m^2/g$ up to 300 $m^2/g$. The amount of mixed metal oxide loaded on the support is sufficient to provide high performance absorption of $H_2S$ from moderately hot gas. The mixed metal oxide is usually present in the support in an amount from 1 to 20 percent by weight usually from 5 to 15 percent by weight.

The preferred supports for the mixed metal oxide sorbents are molecular sieves such as Group I, II or III metal aluminosilicates preferably the common sodium or calcium aluminosilicates having an $AlO_2/SiO_2$ ratio within ±20 percent of stoichiometry of the particular crystalline class employed.

Van der Wal et al. (8) describe the use of metal oxides on an inert support (surface area is less than 10$m^2/g$) to remove $H_2S$, COS and $CS_2$ from gases at a temperature from 5 to 800° C. 20% by weight of the support has a particle size of less than 40 mm and the capacity of the support for sulfur is at least 20% of the weight of the metal oxide. The spent support loaded with metal-sulfur compounds can be regenerated by passing a gas containing oxidizing agents over it.

Sub et al. (10) discloses the use of a copper containing zeolite in the oxidative absorption of $SO_2$ from a $SO_2$ containing heavy oil at 450° C. Copper is introduced by ion-exchange Eberly, Jr. (2) teaches scrubbing of catalyst cracker process stream with a zinc or cadmium exchanged zeolite. This patent contains a review of the use of ion-exchanged zeolites as sulfur absorbers.

The remaining references teach use of zeolites in cracking catalysts or in the selective absorption of sulfur containing compounds. Vasalos, et al. (1) use zeolite dispersed in a refractory matrix as a fluidized bed cracking catalyst at 850° F. to 1200° F. Yoo, et al. (7) disperse zeolites in a spinal as cracking catalyst. Nieskens (6) removes $H_2S$ from a gas with a ZnO supported on a zeolite. Mester (5) uses a refractory material containing a rare earth metal and a transition metal such as cobalt as a sulfur absorbent. DeBras (4) et al. removes carbonyl sulfide with a mixture of zinc oxide and silica/alumina. Bertolacini, et al. (3) uses a mixture of a metal oxide such as zinc oxide and yttrium and optionally lanthanum to remove $SO_2$ from a gas. Bal, et al. (11) use X-type zeolites to remove sulfur from ethyl benzene.

STATEMENT OF THE INVENTION

It has now been discovered that certain metal ion-exchanged metal zeolites can efficiently remove more than 50% of the organosulfur compounds from fluid hydrocarbon fuels, particularly diesel fuel at moderate temperatures. The metal ion-exchanged zeolites can subsequently be regenerated a plurality of times to provide an efficient desulfurization system. The system of the invention will find use in petroleum refining, natural gas processing, utilities and in chemical processing plants to prevent poisoning of catalysts. The desulfurization system of the invention will improve the air environment by providing cleaner emissions.

From studies conducted by exchanging zeolite 13X with numerous metal ions it was determined that, Cu zeolite, La zeolite or their mixtures can remove up to 60% of organosulfur compounds from high sulfur fluid fuels at low temperature and at atmospheric pressure. It has been shown that these zeolite-based organosulfur sorbents retain near full sulfur capacity after five sulfidation-regeneration cycles. The Cu, La or mixed Cu-La zeolites are capable of (1) removing organosulfur compounds from liquid petroleum fractions in atmospheric pressure operation and at temperatures below 300° C. and (2) of regenerating the sorbent material repetitively while maintaining activity and capacity.

The use of CuEx zeolite alone, in combination with LaEx zeolite, or as CuLaEx zeolite, or sequentially with LaEx or CuLaEx zeolite provides an efficient sorbent for removal of organosulfur compound from liquid hydrocarbon fuels.

The successful use of various ion exchanged zeolites, i.e., various ions and various zeolites, to remove organosulfur compounds from liquid hydrocarbon fuels has been demonstrated. Evidence of the removal of sulfur compounds from commercial diesel fuel, as well as specific sulfur compounds from n-tetradecane, together with regeneration of the sorbent has been obtained. Furthermore, the removal of organic sulfur compounds by a relatively simple, non-energy intensive process has been demonstrated. The effectiveness for sulfur removal is a function of the hydrocarbon in which the organic sulfur compounds reside, and the type of organic sulfur compound being removed, relative to the zeolite sorbent prepared.

These and many other features and attendant advantages of the invention will become apparent as the invention becomes better understood by reference to the following detailed description when considered in conjunction with the accompanying drawing.

DETAILED DESCRIPTION OF THE INVENTION

The invention utilizes porous crystalline aluminosilicates as the sulfur sorbent. Sodium type zeolites have a free lattice opening of about 3.5 Angstroms while the calcium analog (5A type) has a free lattice opening of about 4.2 Angstroms. Preferred zeolites for use in the invention have a free lattice opening above 6 Angstroms, usually X-type zeolites which have a free lattice opening of about 10 Angstroms and a $SiO_2/AlO_2$ ratio of 106/80. The exchanged metal ion is present on the zeolite in an amount of at least 0.05 molar to 0.5 molar generally from about 0.1 to 0.3 molar. In experiments to determine sulfur absorption efficiently the desulfurization step is operated at a temperature below 300° C. The liquid fuel is refluxed with the sorbent until at least 30% by weight of sulfur is removed. Diesel fuel is refluxed at a temperature of about 250° C. usually for at least 0.1 hour, usually from 0.5 to 5 hours. The molar ratio of metal ion (Cu/La) to the sulfur content of the fuel is at least 2 usually from 4 to 15.

Figure 1:
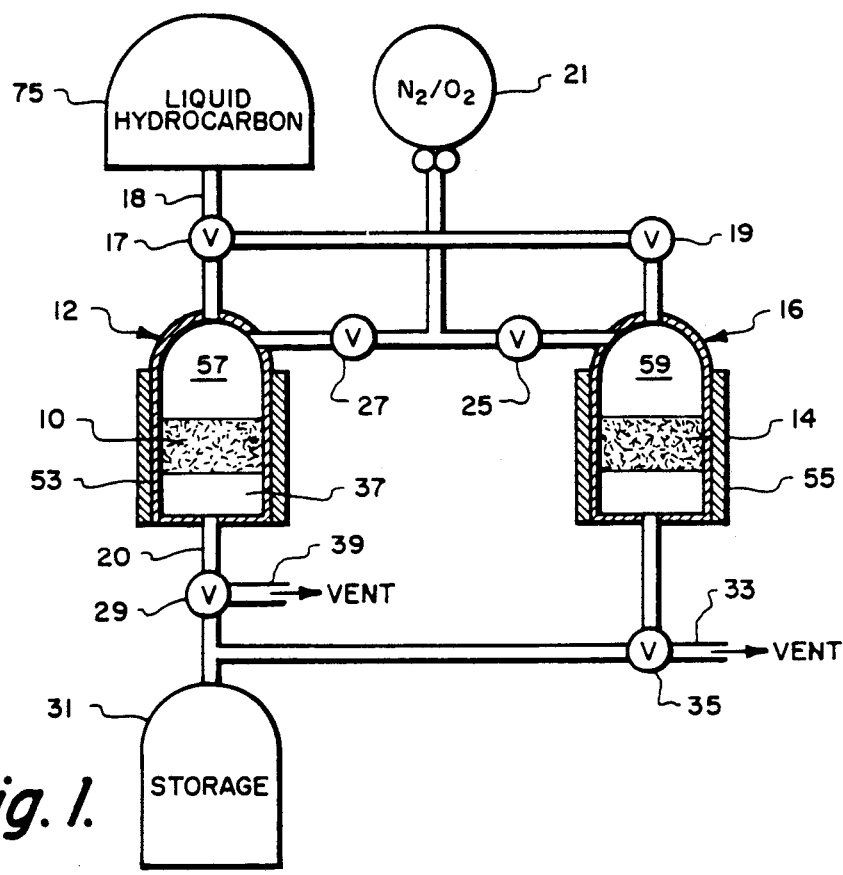
FIG. 1 is a schematic-block diagram of the system of the invention for the removal of organosulfur compounds from a stream of liquid hydrocarbon such as diesel fuel.
Figure 2:
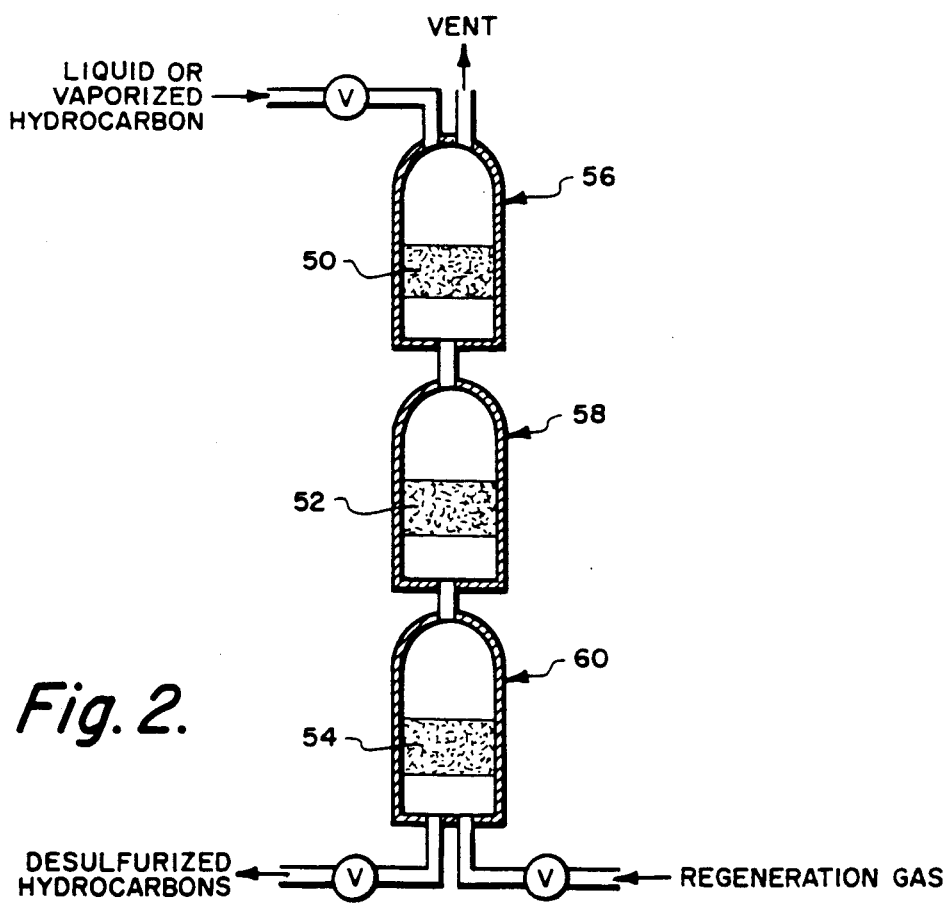
FIG. 2 is a schematic diagram view of a further system for use in the desulfurization of liquid fuels in accordance with the invention.

Referring now to FIG. 1, a schematic apparatus for practicing the sulfur removal process of the invention is illustrated. The metal ion-exchanged molecular sieve sorbent of the invention is provided in the form of two parallel, liquid-permeable sulfur sorption beds, 10, 14. Bed 10 is disposed in sorbent vessel 12 and bed 14 is disposed in sorbent vessel 16. The vessels 12, 16 contain heating means such as jackets 53, 55 to heat the liquid being treated to reflux temperature. The upper zone 57, 59 of each vessel functions as a condenser. The sorbent can be in the form of uneven or shaped particles or in the form of monolithic supports made up of a series of columns or channels or in the form of a wash coat of zeolite on a monolithic support. The sorbent can be mixed particles such as physical mixtures of CuEx zeolite and LaEx zeolite as well as chemical mixtures of CuLaEx zeolite. As shown in FIG. 2 higher amounts of sulfur compounds are removed from the liquid fuel by sequentially subjecting the fuel to different sorbent beds connected in series such as a first bed 50 of CuEx zeolite, a second bed 52 of LaEx zeolite and a third bed 54 of CuEx zeolite housed in heated vessels 56, 58, 60, respectively. The beds of sorbent could be housed in a single vessel separated by porous supports such as screens. The beds need not be reflux vessels but can merely be heated beds which serve the same function as the heated hydrocarbon feedstock passing through an unheated bed.

Physical and chemical combinations of the Cu, La-Ex changed zeolites such as CuEx-LaEx or CuLaEx can also be used in the separate beds.

One of the sorbent vessels such as 12 receives a charge of petroleum liquid fraction such as diesel fuel from supply tank 75 through line 18 with valve 17 open and valve 19 closed. The sorbent vessel 12 is then closed and heated to reflux. Concurrently bed 14 is being regenerated by means of a flow of regenerating gas from tank 21 with valve 25 open and valve 27 closed. Selector valve 29 is turned toward storage tank 31 while selector valve 35 is turned toward vent 33. The refluxing liquid flows through the bed 10, enters the pores of the metal ion-exchanged sorbent and reacts with the metal to form metal sulfide. A fuel stream free of sulfur or having a reduced sulfur concentration leaves the vessel through line 20. Gases 37 can be recovered through outlet line 20 with selector valve 29 turned toward vent 39 and delivered to a sulfur recovery unit, sulfuric acid production unit, or an $SO_2$ scrubber for further processing or to exhaust.

During regeneration of a sulfide bed such as 14, a hot regeneration gas stream enters vessel 16, flows through bed 14 and regenerates the metal sulfide to metal ion. The sulfur dioxide containing gas stream can be recovered through vent line 33 and may be treated in any of a variety of well-known methods. The ratio of inert to oxidizing gas and the temperature of the vessel 16 undergoing regeneration, are matched to maintain the same time interval between regeneration and on-line sulfur sorption. The preferred regeneration gases for an economic, commercial operation are nitrogen and air, usually a range of dilution ratios of nitrogen to air being of the order of 60/40 to 80/20, by volume with 70/30 being the preferred ratio. The nitrogen source may be from the exhaust of the sulfur removal system which would reduce the amount of nitrogen make-up required. The air source may be a fuel cell cathode exhaust which is oxygen-poor and would require no nitrogen diluent. The temperature of the regeneration gas is usually maintained below 500° C. to prevent volatilization and/or sintering of the metal mixture. Generally, the regeneration temperature will be from 300° C. to 500° C., preferably from 425° C. to 475° C.

Metal exchange of zeolite 4A and 13X was carried out by first exchanging the sodium in the zeolite with ammonium ($NH_4^+$) ion and then exchanging the $NH_4^+$ with higher affinity metal ions.

The ammonium exchange of the zeolites was carried out by the zeolite with 1.0 molar $NH_4NO_3$ solution (with periodic stirring) for 24 hours. At the end of this time, the treated zeolite was well washed with distilled water and the treatment with $NH_4NO_3$ solution was repeated. These treatment steps typically lowered the sodium content of the zeolite from 13.0 wt% to 1.0 wt%.

The ammonium exchanged zeolite was added to a generally acidic solution containing appropriate metal cations and allowed to stay in contact with the solution (with periodic stirring) for 48 hours. The concentration of the metal cations in the solution varied from 0.10 to 0.20 molar. The temperature of the zeolite-solution mixture was room temperature in most cases, though for some selected rare-earth ion exchange steps, it was raised to about 80° C.

The metal exchanged zeolite was well rinsed with distilled water and then dried in a hot-air oven at 300° F.

Table (1) summarizes the experimental conditions deployed in preparation of the metal exchanged zeolite samples.

TABLE 1

SUMMARY OF EXPERIMENTAL CONDITIONS FOR METAL ION EXCHANGE OF ZEOLITE 13X

| SORBENT NAME | CATION SOURCE | CATION CONCEN- TRATION (MOLAR) | ION EX- CHANGE TEMP. (°C.) | CON- TACT TIME (HR) |
|---|---|---|---|---|
| 3CuEX13X 5CuEX13X | $Cu(NO_3)_2$ | 0.2 | 25 | 48 |
| NiEX13X | $Ni(NO_3)_2$ | 0.2 | 25 | 48 |
| AgEX13X | $AgNO_3$ | 0.2 | 25 | 48 |
| ZnEX13X | $Zn(NO_3)_2$ | 0.2 | 25 | 48 |
| CoEX13X | $Co(NO_3)_2$ | 0.2 | 25 | 72 |
| CrEX13X | $Cr(NO_3)_3$ | 0.2 | 25 | 48 |
| MnEX13X | $Mn(NO_3)_2$ | 0.2 | 25 | 48 |
| 3MoEX13X | $MoO_2Cl_2$ | 0.1 | 25 | 72 |
| LaEX13X 2LaEX13X 3LaEX13X | $La(NO_3)_3$ | 0.1 | 75–80 | 24 |
| CeEX13X | $Ce(NH_4)_2(NO_3)_6$ | 0.1 | 75–80 | 24 |
| 2CeEX13X | $Ce(NO_3)_3$ | 0.1 | 75–80 | 24 |

Mixed Copper-Lanthanum Exchanged Zeolite Samples are prepared by two-stage ion exchange, using first one cation, then the other.

Lanthanum exchange was carried out first at 80° C. Followed by copper exchange at room temperature to produce sample CuLaEx13X.

When Copper exchange was carried out first at room temperature, followed by lanthanum exchange at 80° C., sample LaCuEX13X was produced.

Tests Conducted to Examine Ability to Remove Sulfur from Diesel Fuel

A pyrex laboratory reflux apparatus with 50 ml or 25 ml reflux flasks was used in all runs. Heating was provided with a 115 V Glas-Col heating mantle. A constant nitrogen flow (about 50 ml/min) was maintained through the reflux unit to maintain an inert atmosphere.

Most reflux temperatures were in the range of 245–265° C. Typically, one hour was required to raise the temperature of diesel fuel from room temperature to where reflux began. The reflux was carried out for about an hour, and then the system was allowed to cool down.

The treated diesel fuel and sorbent were separated by decantation. The treated sorbent was washed with toluene and then air dried at room temperature in a pyrex dish.

Sulfur Analysis on Diesel Fuel Samples

Sulfur analyses on all fuel samples for the determination of total sulfur content was made by utilizing an X-Ray spectrographic method (ASTM D2622). The possible measurement error in sulfur weight fraction determined by this method is less than 5 percent. Results are presented in Table 2.

TABLE 2

DIESEL TREATED WITH VARIOUS METAL ION EXCHANGED ZEOLITES (13X)

| SER NO. | SORBENT NAME | SORBENT ANALYSIS, CONDITION & SIZE | REFLUX TEMP RANGE (°C.) | REFLUX TIME (hr) | TYPE FUEL | SULFUR CHANGE ORIGINAL / FINAL | % S REMOVAL | MOLES M± / MOLES S |
|---|---|---|---|---|---|---|---|---|
| 1. | 3CuEX13X | 7.92% Cu<br>8 × 12 Beads<br>450° F. Dried | 250–255 | 1 | Diesel I | 0.42 / 0.23 | 45 | 4.20 |
| 2. | NiEX13X | 5.46% Ni<br>8 × 12 Beads<br>450° F. Dried | 247–250 | 1 | Diesel I | 0.42 / 0.34 | 17 | 7.44 |
| 3. | AgEX13X | 29.2% Ag<br>8 × 12 Beads<br>450° F. Dried | 246 | 1 | Diesel I | 0.42 / 0.34 | 17 | 21.6 |
| 4. | ZnEX13X | 7.50% Zn<br>8 × 12 Beads<br>450° F. Dried | 260–262 | 1 | Diesel III | 0.48 / 0.37 | 23 | 6.67 |
| 5. | CoEX13X | 5.40% Co<br>8 × 12 Beads<br>450° F. Dried | 260 | 1 | Diesel III | 0.48 / 0.38 | 21 | 5.86 |
| 6 | MnEX13X | 6.15% Mn<br>8 × 12 Beads<br>450° F. Dried | 250–260 | 1 | Diesel III | 0.48 / 0.40 | 15 | 8.94 |
| 7. | CrEX13X | 4.40% Cr<br>8 × 12 Beads<br>450° F. Dried | 262 | 2 | Diesel III | 0.48 / 0.48 | 0 | — |
| 8. | 3MoEX13X | 8 × 12 Beads | 255–262 | 1 | Diesel III | 0.47 / 0.47 | 0 | — |
| 9. | LaEX13X | 13.1% La<br>8 × 12 Beads<br>450° F. Dried | 254° | 1 | Diesel III | 0.48 / 0.37 | 23 | — |
| 10. | 2CeEX13X | 13.0% Ce<br>8 × 12 Beads<br>450° F. Dried | 250–255 | 1 | Diesel III | 0.48 / 0.37 | 23 | — |
| 11. | 2CuLaEX13X | 2.9% Cu<br>10.0% La<br>8 × 12 Beads<br>450° F. Dried | 250–262 | 1 | Diesel III | 0.48 / 0.28 | 41 | — |
| 12. | LaCuEX13X | | 250–262 | 1 | Diesel III | 0.48 / 0.32 | 33 | — |

Table (2) shows the effectiveness of sorbents where different metal ions were exchanged into zeolite 13X. Note that for a single treatment of diesel fuel, copper proved to be the best agent in removing sulfur from the diesel fuel. Up to 45 percent of sulfur in one of the high sulfur fuel samples (Diesel I) was removed after a single reflux with copper exchanged zeolite 13X (3CUEX13X). The metal to sulfur ratio, moles M+/moles S, in this case is 4.20. For a different fuel sample (Diesel III), sulfur removal in a single reflux was 33 percent. This difference is attributed to a different composition of sulfur species but also could be impacted by the liquid hydrocarbon feedstock composition. Of the cation exchanged zeolites that were tested, zinc, cobalt, lanthanum and cerium exchanged zeolite 13X rank second in removing sulfur from diesel fuel. They remove about 23 percent sulfur and the moles M+/moles S ration is about 6.0. This indicates a possible lower affinity of these metals to enter into complex formation with sulfur as compared to copper, but may also be attributed to the cation location within the lattice, lattice (and therefore cagesize) alterations, and other side reactions.

Nickel, silver and manganese rank even lower in removing sulfur from the diesel, each removing 15 to 17 percent of the total sulfur. Finally, chromium and molybdenum exchanged zeolite 13X samples remove practically no sulfur.

When two-step reflux treatments of diesel fuel were performed with CuEX13X and LaEX13X, more sulfur was removed (50%) than when the single treatment of each of the sorbents was used alone. A two-step treatment of CuEX13X shows only a fractional amount more (18%) sulfur is removed in the second step than in the first step. This indicates the potential for synergistic behavior between two cations within a zeolite or mixed beds of two cations in two different zeolites to enhance the sulfur removal capabilities.

Combination of Copper and Rare Earth Exchanted Zeolites

A reflux scheme which removed about 56% of sulfur from Diesel III used three steps: (1) Reflux with 3CUEX13X, (2) reflux with LAEX13X, and (3) reflux with 3CUEX13X.

The same extent of sulfur removal (56%) could also be achieved in two stages.

The same extent of sulfur removal (56%) could also be achieved in two stages. This scheme incorporates (1) Reflux with 3CUEX13X, and (2) reflux with CULAEX13X. A follow up of the treated diesel fuel from this scheme by a third reflux employing the sorbent LACEX13X removed only a little additional sulfur, the total sulfur removal increasing to 60 percent.

Regeneration of Spent Zeolite Sorbents

Regeneration of spent sorbent 3CUEX13X was studied in five cycles consisting of sulfidation (in reflux with Diesel III) and regeneration. In each regeneration step, the spent sorbent was packed in a quartz reactor and heated to 400° C. in a flow of nitrogen. When the sorbent bed temperature reached 400° C., air flow into the reactor was initiated without altering the nitrogen flow so that a 70% $N_2$-30% air mixture flowed through the sorbent bed. The bed temperature rose gradually, reaching maximum of about 460° C. in 30 to 40 minutes after initiation of air flow. Subsequently, the bed temperature came down to 400° C. The flow of the $N_2$-air mixture, was maintained for 2 hours. At the end of this period, the reactor was allowed to cool in a flow of nitrogen.

The above regeneration procedure restored the color of the sorbent beads from black to the original light blue. The regenerated sorbent was tested by refluxing it with fresh diesel fuel to determine its ability to repetitively remove sulfur and its capacity.

The combination of regeneration and sulfidation steps outlined above was repeated four more times. The sulfur removal capacity in each cycle was determined by sulfur analysis on fresh and treated fuel samples.

The measurements described above indicate that there was a small drop in sulfur removal capacity of the sorbent after two cycles. But this drop was limited to 5 percent. Subsequent cycles (3, 4 and 5) did not significantly reduce the sulfur removal capacity and the sorbent appeared to have reached a stable state of activity.

Comparative Testing with Controlled Fuel

Since the sulfur compounds in diesel fuel are many and varied, and since the hydrocarbon composition also varies over a wide range, some controlled tests were also conducted. In one instance, the diesel fuel was separated into "light" and "heavy" fractions, determined by temperature. Subsequent sulfur removal tests showed that more sulfur was removed from the lighter fraction than from the heavier fraction, indicating that a difference in complexity of sulfur compounds may impact their ease of removal. Selected "model" organic sulfur compounds were also used with n-tetradecane as solvent to determine degree of difficulty of sulfur removal that the zeolite sorbents exhibited when the hydrocarbon environment was controlled.

Although the copper-containing 13X showed high performance with most, the rare-earth-containing zeolites demonstrated a different and perhaps complementary behavior to the copper-containing zeolite. These results tend to suggest that the combined copper/rare-earth containing zeolites would behave better than simply additive and that more improvements are possible in sulfur removal performance. The tests with diesel fuel tend to bear this out.

Metal exchanged zeolite based sorbents have been developed which can remove about 60 percent of sulfur from diesel fuels and other petroleum fractions. The method has been demonstrated by use of a simple reflux of the sorbent with the liquid fuel at atmospheric pressure and in the temperature range of 245–265° C. The spent sorbent can be almost fully regenerated and has been found to retain its sulfur capacity over five cycles. The simplicity of this operation offers considerable advantages over the existing industrial method for removing sulfur from petroleum fractions known as hydrodesulfurization (HDS), which employs high pressure/temperature hydrogen, and subsequent $H_2S$ scrubbing beds.

The invention can be used to desulfurize any liquid petroleum fraction such as diesel I, fuel, fuel oil or similar hydrocarbon liquids. It can also be used in desulfurization of heavy fractions such as the bottoms from distillation or cracking operations or lighter fractions such as alkanes, gasolines or gaseous hydrocarbons such as natural or synthetic fuel gases.

It is to be realized that only preferred embodiments of the invention have been described and that numerous substitutions, modifications and alterations are permissible without departing from the spirit and scope of the invention as defined in the following claims.

We claim:

1. A sulfur sorbent comprising a porous, high surface area, refractory, alumino-silicate synthetic zeolite support having a free lattice spacing of at least 6 Angstroms, having a ratio of $AlO_2$ to $SiO_2$ within about ±20% of stoichiometry and containing from 0.05 to 3.0 moles of copper ions and of lanthanum ions.

2. A sorbent vessel containing a first bed of copper ion exchanged synthetic zeolite containing from 0.05 to 3.0 moles of copper ions and a ratio of $AlO_2$ to $SIO_2$ within about ±20% of stoichiometry and a second bed in fluid connection with said first bed and containing lanthanum ion-exchanged synthetic zeolite containing from 0.05 to 3.0 moles of lanthanum and having a ratio of $AlO_2$ to $SiO_2$ within about ±20% of stoichiometry.

3. A sorbent vessel according to claim 2 in which said vessel further includes a third bed of copper ion exchanged zeolite in fluid communication with said second bed.

* * * * *